United States Patent
Bandi et al.

(10) Patent No.: US 12,555,416 B2
(45) Date of Patent: Feb. 17, 2026

(54) SYSTEMS AND METHODS OF REMOTE WAKE-UP OF A VEHICLE

(71) Applicant: Ford Global Technologies, LLC, Dearborn, MI (US)

(72) Inventors: Krishna Bandi, Farmington Hills, MI (US); Meghna Menon, Ann Arbor, MI (US); Mario Anthony Santillo, Canton, MI (US); Gregory P. Linkowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 18/484,238

(22) Filed: Oct. 10, 2023

(65) Prior Publication Data

US 2025/0118114 A1 Apr. 10, 2025

(51) Int. Cl.
*G07C 5/00* (2006.01)
*H04W 4/44* (2018.01)

(52) U.S. Cl.
CPC .............. *G07C 5/008* (2013.01); *H04W 4/44* (2018.02)

(58) Field of Classification Search
CPC ................................. G07C 5/008; H04W 4/44
USPC ............................................................. 701/1
See application file for complete search history.

(56) References Cited

U.S. PATENT DOCUMENTS

| | | | | |
|---|---|---|---|---|
| 10,198,948 | B2 * | 2/2019 | Hanks | G08G 1/168 |
| 2011/0248678 | A1 * | 10/2011 | Wade | B60L 58/25 |
| | | | | 320/119 |
| 2014/0172190 | A1 | 6/2014 | Kalinadhabhotla et al. | |
| 2014/0274223 | A1 | 9/2014 | Kleve et al. | |
| 2015/0264649 | A1 | 9/2015 | Pandya et al. | |
| 2020/0322770 | A1 | 10/2020 | Lepp et al. | |
| 2021/0086761 | A1 | 3/2021 | El Assaad et al. | |
| 2022/0060957 | A1 | 2/2022 | Shuman et al. | |
| 2022/0068041 | A1 * | 3/2022 | Palakonda | H04W 4/06 |
| 2022/0123570 | A1 | 4/2022 | Fuchs et al. | |
| 2022/0124672 | A1 | 4/2022 | Xu et al. | |
| 2022/0139129 | A1 * | 5/2022 | Lerner | G07C 9/00309 |
| | | | | 340/5.61 |
| 2022/0292971 | A1 * | 9/2022 | Park | G06V 20/586 |
| 2022/0295253 | A1 * | 9/2022 | Hwang | B60W 50/00 |
| 2022/0358382 | A1 | 11/2022 | Gotesdyner et al. | |
| 2022/0383750 | A1 | 12/2022 | Banjade et al. | |
| 2022/0388505 | A1 | 12/2022 | Banjade et al. | |
| 2023/0145508 | A1 | 5/2023 | Kaphengst et al. | |
| 2023/0262432 | A1 * | 8/2023 | Ahmed | H04L 67/12 |
| | | | | 455/456.2 |

(Continued)

FOREIGN PATENT DOCUMENTS

| | | |
|---|---|---|
| CN | 11243807 | 3/2021 |
| KR | 1020230048019 | 4/2023 |

*Primary Examiner* — Tyler D Paige
(74) *Attorney, Agent, or Firm* — Burris Law, PLLC

(57) ABSTRACT

A method for remotely waking-up a vehicle includes the request of a vehicle power state of at least one non-responsive vehicle of a plurality of autonomously operated vehicles, the verification—via a remote-start-wakeup automated vehicle marshaling algorithm installed within an infrastructure—of a current power state of the at least one non-responsive vehicle, the identification that the at least one non-responsive vehicle is in an off-state, and the generation of a wake-up command that is wirelessly transmitted to the at least one non-responsive vehicle via a CV2X-PC5 protocol.

20 Claims, 8 Drawing Sheets

(56) References Cited

U.S. PATENT DOCUMENTS

| | | | |
|---|---|---|---|
| 2023/0264601 A1* | 8/2023 | Haberlein | B60L 58/27 701/22 |
| 2023/0276209 A1 | 8/2023 | Knopp et al. | |
| 2024/0270122 A1* | 8/2024 | Ameur | B60L 58/27 |
| 2025/0118114 A1* | 4/2025 | Bandi | H04W 4/44 |

* cited by examiner

SYSTEMS AND METHODS OF REMOTE WAKE-UP OF A VEHICLE

FIELD

The present disclosure relates to the waking-up of a vehicle in a remote manner. More specifically, the present disclosure relates to remotely waking up the vehicle via a secure wireless connection.

BACKGROUND

The statements in this section merely provide background information related to the present disclosure and may not constitute prior art.

Infrastructures used to marshal vehicles are able to remotely wake-up the vehicles via a cellular wireless communication. However, by relying on the cellular wireless communication, significant costs are added to the manufacturing process. Additionally, network congestion and packet delays are common occurrences when cellular wireless communication is used. Furthermore, the communication between the infrastructure and the vehicles can be vulnerable to relay attacks when relying on cellular communication. The present disclosure addresses these and other issues related to the remote wake-up of vehicles.

SUMMARY

This section provides a general summary of the disclosure and is not a comprehensive disclosure of its full scope or all of its features.

The present disclosure provides a computer implemented method comprising: requesting, from at least one non-responsive vehicle of a plurality of autonomously operated vehicles, a vehicle power state of the at least one non-responsive vehicle; verifying, via a remote-start-wakeup automated vehicle marshaling (AVM) algorithm installed within an infrastructure and in response to the request, a current power state of the at least one non-responsive vehicle; identifying, based on the current power state of the at least one non-responsive vehicle failing to exceed a threshold, that the at least one non-responsive vehicle is in an off-state; and generating, based on identifying that the at least one non-responsive vehicle is in the off-state, a remote wake-up command, wherein the remote wake-up command is wirelessly transmitted to the at least one non-responsive vehicle via a CV2X-PC5 protocol; further comprising: broadcasting, to each of the vehicles of the plurality of autonomously operated vehicles, one or more commands, wherein the one or more commands include the remote wake-up command; receiving, from each of the vehicles of the plurality of autonomously operated vehicles and based on the broadcasted one or more commands, a return message, wherein the return message confirms receipt of the broadcasted one or more commands; and determining, by the AVM algorithm, that a globally unique identifier (GUID) associated with the infrastructure matches the GUID of the return message; wherein the threshold is defined by the current power state failing to exceed a minimum charge-value, a time period of at least one day that the at least one non-responsive vehicle is in the off-state, or a combination thereof; further comprising: receiving, based on the current power state of the at least one non-responsive vehicle failing to exceed the threshold, battery data associated with the at least one non-responsive vehicle, wherein the battery data includes a discharge status of a low voltage battery state and a high voltage battery state corresponding to the at least one non-responsive vehicle; further comprising: receiving, based on the current power state of the at least one non-responsive vehicle failing to exceed the threshold, battery data associated with the at least one non-responsive vehicle, wherein the battery data includes a charge utilization status of a low voltage battery state and a high voltage battery state corresponding to the at least one non-responsive vehicle; and wherein generating the remote wake-up command further comprises: causing, based on identifying that the at least one non-responsive vehicle is in the off-state, a power mode state of the at least one non-responsive vehicle to switch from a full power mode to a low power mode; and causing, based on switching from the full power mode to the low power mode, the at least one non-responsive vehicle to enter the off-state.

The present disclosure provides another method comprising: receiving, at an autonomously operated vehicle in an off-state, from an infrastructure, a remote wake-up command, wherein the remote wake-up command is wirelessly transmitted via a CV2X-PC5 protocol; determining, by a remote-start-wakeup automated vehicle marshaling (AVM) algorithm installed on the autonomously operated vehicle, that a globally unique identifier (GUID) associated with the autonomously operated vehicle matches the GUID of the remote wake-up command; transmitting, based on a low power supply battery and a high power supply battery exceeding a power threshold and the GUID of the autonomously operated vehicle matching the GUID of the remote wake-up command, one or more updates to the infrastructure, wherein the one or more updates are wirelessly transmitted via the CV2X-PC5 protocol; and initiating, based on the one or more updates sent to the infrastructure, a shutdown sequence associated with the autonomously operated vehicle; further comprising: monitoring the low power supply battery and the high power supply battery when the autonomously operated vehicle is in the off-state; wherein initiating the shutdown sequence further comprises: transmitting, to the infrastructure, in response to a specified charge associated with the low power supply battery or the high power supply battery falling below the power threshold, battery data associated with the autonomously operated vehicle; stopping, based on the battery data, the autonomously operated vehicle; and disconnecting, based on the battery data and the autonomously operated vehicle stopping, the autonomously operated vehicle from the infrastructure; and wherein the battery data includes a discharge status of a low voltage battery state and a high voltage battery state corresponding to the autonomously operated vehicle; and wherein the battery data includes a charge utilization status of a low voltage battery state and a high voltage battery state corresponding to the autonomously operated vehicle.

The present disclosure provides a system comprising: an infrastructure configured to: request, from at least one non-responsive vehicle of a plurality of autonomously operated vehicles, a vehicle power state of the at least one non-responsive vehicle, verify, via a remote-start-wakeup automated vehicle marshaling (AVM) algorithm installed within the infrastructure and in response to the request, a current power state of the at least one non-responsive vehicle, identify, based on the current power state of the at least one non-responsive vehicle failing to exceed a threshold, that the at least one non-responsive vehicle is in an off-state, and generate, based on identifying that the at least one non-responsive vehicle is in the off-state, a remote wake-up command, wherein the remote wake-up command is wirelessly transmitted to the at least one non-responsive vehicle via a CV2X-PC5 protocol; and the plurality of autonomously operated vehicles configured to: receive, at each vehicle of the plurality of autonomously operated vehicles in the off-state, from the infrastructure, the remote wake-up command, determine, by an AVM algorithm installed on each of the vehicles of the plurality of autonomously operated vehicles, that a globally unique identifier (GUID) installed on each vehicle of the plurality of the autonomously operated vehicles matches the GUID of the remote wake-up command, transmit, based on a low power supply battery and a high power supply battery not exceeding a power threshold and the GUID associated with each vehicle of the plurality of autonomously operated vehicles matching the GUID of the remote wake-up command, one or more updates to the infrastructure, wherein the one or more updates are wirelessly transmitted via the CV2X-PC5 protocol, identify, based on the one or more updates sent to the infrastructure, the at least one non-responsive vehicle from the plurality of autonomously operated vehicles, and initiate, based on the identification of the at least one non-responsive vehicle, a shutdown sequence associated with the at least one non-responsive vehicle, wherein the infrastructure is further configured to: broadcast, to each of the vehicles of the plurality of autonomously operated vehicles, one or more commands, wherein the one or more commands include the remote wake-up command; receive, from each of the vehicles of the plurality of autonomously operated vehicles and based on the broadcasted one or more commands, a return message, wherein the return message confirms receipt of the broadcasted one or more commands; and determine, by the AVM algorithm installed within the infrastructure, that the GUID associated with the infrastructure matches the GUID of the return message; wherein the threshold is defined by the current power state failing to exceed a minimum charge-value, a time period of at least one day that the at least one non-responsive vehicle is in the off-state, or a combination thereof; wherein the infrastructure is further configured to: receive, based on the current power state of the at least one non-responsive vehicle failing to exceed the threshold, battery data associated with the at least one non-responsive vehicle, wherein the battery data includes a discharge status of a low voltage battery state and a high voltage battery state corresponding to the at least one non-responsive vehicle; wherein the infrastructure is further configured to: receive, based on the current power state of the at least one non-responsive vehicle failing to exceed the threshold, battery data associated with the at least one non-responsive vehicle, wherein the battery data includes a charge utilization status of a low voltage battery state and a high voltage battery state corresponding to the at least one non-responsive vehicle; wherein each of the vehicles of the plurality of autonomously operated vehicles are further configured to: monitor the low power supply battery and the high power supply battery when each of the plurality of autonomously operated vehicles are in the off-state; wherein each of the plurality of autonomously operated vehicles are further configured to: transmit, to the infrastructure, in response to a specified charge associated with the low power supply battery or the high power supply battery falling below the power threshold, battery data associated with the at least one non-responsive vehicle; stop, based on the battery data, the at least one non-responsive vehicle; and disconnect, based on the battery data and the at least one non-responsive vehicle stopping, the at least one non-responsive vehicle from the infrastructure; wherein the battery data includes a discharge status of a low voltage battery state and a high voltage battery state corresponding to the autonomously operated vehicle; and wherein the battery data includes a charge utilization status of a low voltage battery state and a high voltage battery state corresponding to the autonomously operate vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
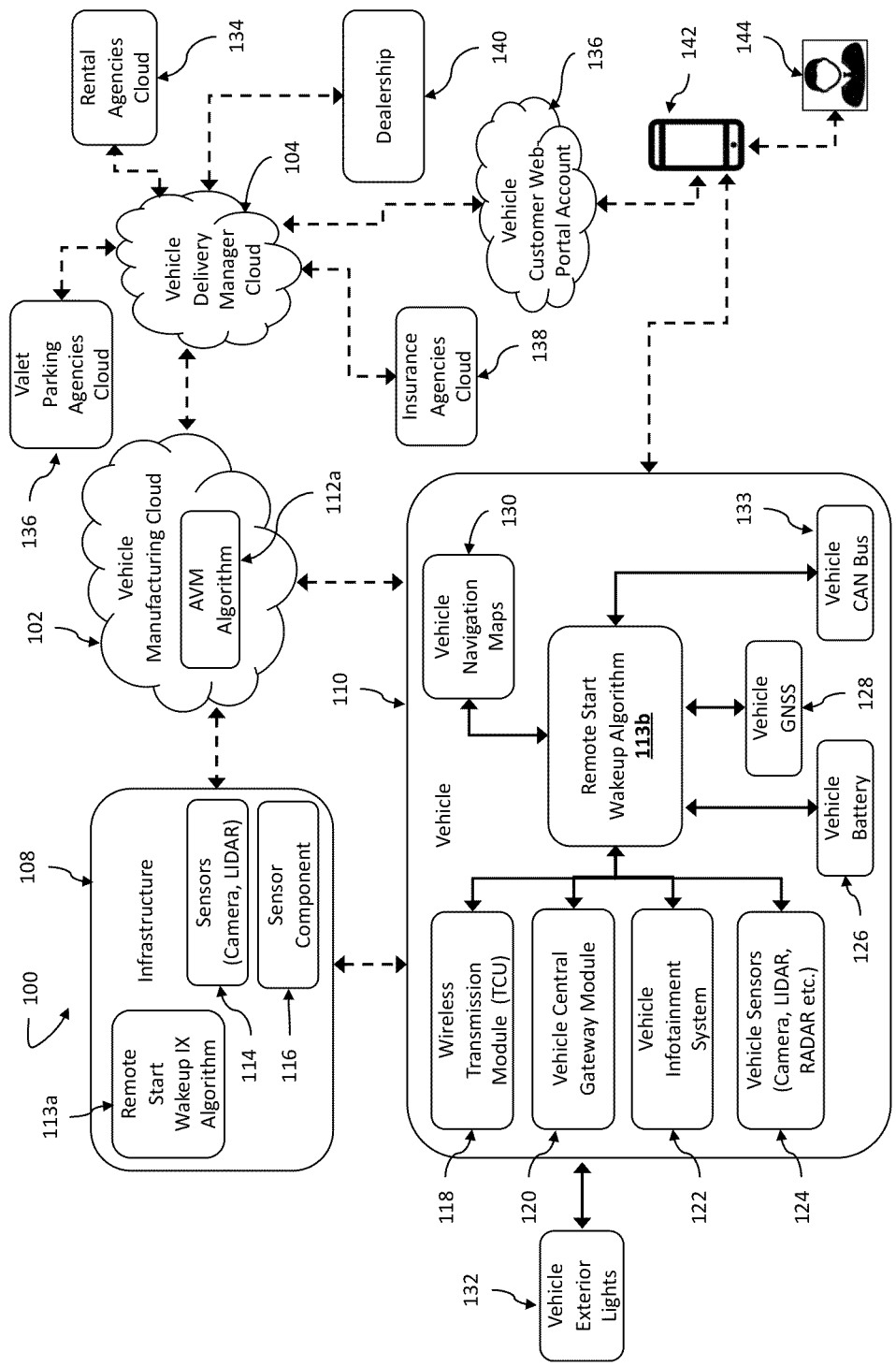
FIG. 1 illustrates an overall system for autonomous vehicle marshaling in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for remotely waking-up a vehicle using a CV2X-PC5 secure wireless communication protocol. By using the CV2X-PC5 secure wireless communication protocol, different inefficiencies are mitigated due to the use of an alternative communicative method than cellular means. Additionally, network congestion and/or packet delays are reduced by using the CV2X-PC5 secure wireless communication protocol and one or more examples described herein. Furthermore, relay attacks can be reduced by using a CV2X-PC5 secure wireless communication protocol and one or more examples described herein.

FIG. 1 shows a schematic block diagram illustration of an automated vehicle marshaling (AVM) system 100. In one or more examples, the AVM system 100 marshals one or more vehicles traveling at a low speed. However, it is understood that the AVM system 100 may marshal one or more vehicles traveling at any speed. It is also understood that the AVM system 100 may marshal semi-autonomous vehicles and/or fully autonomous vehicles.

The AVM system 100 generally includes a vehicle manufacturing cloud 102, a vehicle delivery manager cloud 104, a vehicle customer web-portal account 106, an infrastructure 108, and a vehicle 110. The vehicle manufacturing cloud 102 operates as the central cloud system that manages and/or facilitates any manufacturing process associated with the vehicle 110. The vehicle manufacturing cloud 102 wirelessly communicates with the vehicle delivery manager cloud 104 and the infrastructure 108. The vehicle manufacturing cloud 102 also wirelessly communicates with the vehicle 110.

The vehicle manufacturing cloud 102 includes an AVM algorithm 112. The AVM algorithm 112 processes status information associated with at least the vehicle 110 of the one or more vehicles. It is understood that the AVM algorithm 112 processes status information associated with each vehicle of the one or more vehicles (e.g., the vehicle 110). The vehicle manufacturing cloud 102 is configured to cause the infrastructure 108 to monitor the progression of the one or more vehicles (i.e., the vehicle 110) as the vehicle(s) progress through a factory floor or parking lot, for example. The vehicle manufacturing cloud 102 is also configured to cause the infrastructure 108 to communicate with the one or more vehicles. For example, the vehicle manufacturing cloud 102 utilizes the AVM algorithm 112 to send instructions to the infrastructure 108 and/or to process information received from the infrastructure 108. The vehicle manufacturing cloud 102 is also configured to cause the vehicle delivery manager cloud 104 to facilitate a delivery of the one or more vehicles (i.e., the vehicle 110) to various locations. For example, the vehicle manufacturing cloud 102 utilizes the AVM algorithm 112 to send instructions to the vehicle delivery manager cloud 104 and/or to process information received from the vehicle delivery manager cloud 104.

The vehicle manufacturing cloud 102 is further configured to communicate directly with the one or more vehicles to cause the one or more vehicles to start, stop, or pause progression through a factory floor or parking lot, for example. The vehicle manufacturing cloud 102 is further configured to control a marshaling speed of the one or more vehicles as the one or more vehicles travel across through the factory floor or parking lot, for example. For example, the vehicle 110 utilizes the AVM algorithm 112 to send instructions to the vehicle 110 and/or to process information received from the vehicle 110.

The infrastructure 108 includes a remote start wake-up infrastructure (IX) algorithm 113a, one or more sensors 114, and a sensor component 116. It is understood that the sensor component 116 may be a sensor controller, for example. The sensor component 116 provides for communication between one or more infrastructures (e.g., the infrastructure 108) and the one or more vehicles. For example, the sensor component 116 may utilize GPS, Wi-Fi, satellite, 3G/4G/5G, and/or Bluetooth™ to communicate with the one or more vehicles. The sensor component 116 also communicates with the one or more sensors 114, such as, for example, one or more of cameras, lidar, radar, and/or ultrasonic devices. The one or more sensors 114 monitor the movement of the one or more vehicles as the vehicle(s) move through, for example, a factory floor or parking lot. As an example, the infrastructure 108 utilizes the remote start wake-up IX algorithm 113a to process and send information to the vehicle manufacturing cloud 102 and/or to process information received from the vehicle manufacturing cloud 102. As another example, the infrastructure 108 utilizes the remote start wake-up IX algorithm 113a to process and send information directly to the vehicle 110 and/or to process information received from the vehicle 110. It is understood that the infrastructure 108 can forward instructions received from the vehicle manufacturing cloud 102 to the vehicle 110. However, it is also understood that the infrastructure 108 can send instructions to the vehicle 110 directly.

The vehicle 110 includes a remote start wake-up algorithm 113b, a wireless transmission module 118, a vehicle central gateway module 120, a vehicle infotainment system 122, one or more vehicle sensors 124, a vehicle battery 126, a vehicle global navigation satellite system 128, vehicle navigation maps 130, vehicle exterior lights 132, and a controller area network (CAN) vehicle bus 133. The wireless transmission module 118 may be a transmission control unit (TCU). The wireless transmission module 118 includes one or more sensors that are configured to gather data and send signals to other components of the vehicle 110. The one or more sensors of the wireless transmission module 118 may include a vehicle speed sensor (not shown) configured to determine a current speed of the vehicle 110; a wheel speed sensor (not shown) configured to determine if the vehicle 110 is traveling at an incline or a decline; a throttle position sensor (not shown) determines if a downshift or upshift of one or more gears associated with the vehicle 110 is required in a current status of the vehicle 110; and/or a turbine speed sensor (not shown) configured to send data associated with a rotational speed of a torque converter of the vehicle 110. The wireless transmission module 118 communicates information, gathered by the one or more sensors, to the remote start wake-up algorithm 113b. In one embodiment, the remote start wake-up algorithm 113b may be disposed as a component within the wireless transmission module 118. For example, the vehicle 110 utilizes the remote start wake-up algorithm 113b to process and send information gathered by the one or more sensors to the infrastructure 108. As another example, the vehicle 110 utilizes the remote start wake-up algorithm 113b to process and send information gathered by the one or more sensors to the vehicle manufacturing cloud 102 directly. The remote start wake-up algorithm 113b is configured to communicate information and/or instructions to the wireless transmission module 118 received from the infrastructure 108 and/or the vehicle manufacturing cloud 102.

The vehicle central gateway module 120 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 133. The vehicle central gateway module 120 is configured to distribute data communicated to the vehicle central gateway module 120 by each of the various domain bus systems to other components of the vehicle 110. The vehicle central gateway module 120 is also configured to distribute information received from the remote start wake-up algorithm 113b to the various domain bus systems. The vehicle central gateway module 120 is further configured to send information to the remote start wake-up algorithm 113b received from the various domain bus systems. For example, the vehicle 110 utilizes the remote start wake-up algorithm 113b to process and send information received from the vehicle central gateway module 120 to the infrastructure 108. As another example, the vehicle 110 utilizes the remote start wake-up algorithm 113b to process and send information received from the vehicle central gateway module 120 to the vehicle manufacturing cloud 102 directly. The remote start wake-up algorithm 113b is configured to communicate information and/or instructions to the vehicle central gateway module 120 received from the infrastructure 108 and/or the vehicle manufacturing cloud 102.

The vehicle infotainment system 122 is a system that delivers a combination of information and entertainment content and/or services to a user 144 of the vehicle 110. It is understood that the vehicle infotainment system 122 can deliver only entertainment content to the user 144 of the vehicle 110, in some examples. It is also understood that the vehicle infotainment system 122 can deliver information services to anyone associated with the vehicle 110, in other examples. As an example, the vehicle infotainment system 122 includes built-in car computers that combine one or more functions, such as digital radios, built-in cameras, and/or televisions. The vehicle infotainment system 122 communicates information associated with the built-in car computers or processors to the remote start wake-up algorithm 113b. For example, the vehicle 110 utilizes the remote start wake-up algorithm 113b to process and send information received from the vehicle infotainment system 122 to the infrastructure 108. As another example, the vehicle 110 utilizes the remote start wake-up algorithm 113b to process and send information received from the vehicle infotainment system 122 to the vehicle manufacturing cloud 102 directly. The remote start wake-up algorithm 113b is configured to communicate information and/or instructions to the vehicle infotainment system 122 received from the infrastructure 108 and/or the vehicle manufacturing cloud 102.

The one or more vehicle sensors 124 may be, for example, one or more of cameras, lidar, radar, and/or ultrasonic devices. For example, ultrasonic devices utilized as the one or more vehicle sensors 124 emit a high frequency sound wave that hits an object (e.g., a wall or another vehicle) and is then reflected back to the vehicle 110. Based on the amount of time it takes for the sound wave to return to the vehicle 110, the vehicle 110 can determine the distance between the one or more vehicle sensors 124 and the object. As another example, camera devices utilized as the one or more vehicle sensors 124 provide a visual indication of a space around the vehicle 110. As an additional example, radar devices utilized as the one or more vehicle sensors 124 emit electromagnetic wave signals that hit the object and is then reflected back to the vehicle 110. Based on the amount of time it takes for the electromagnetic waves to return to the vehicle 110, the vehicle 110 can determine a range, velocity, and angle of the vehicle 110 relative to the object.

The one or more vehicle sensors 124 communicate information associated with the position and/or distance at which the vehicle 110 is relative to the object to the remote start wake-up algorithm 113b. For example, the vehicle 110 utilizes the remote start wake-up algorithm 113b to process and send information received from the one or more vehicle sensors 124 to the infrastructure 108. As another example, the vehicle 110 utilizes the remote start wake-up algorithm 113b to process and send information received from the one or more vehicle sensors 124 to the vehicle manufacturing cloud 102 directly. The remote start wake-up algorithm 113b is configured to communicate information and/or instructions to the one or more vehicle sensors 124 received from the infrastructure 108 and/or the vehicle manufacturing cloud 102.

The vehicle battery 126 is controlled by a battery management system (not shown) that provides instructions to the vehicle battery 126. For example, the battery management system provides instructions to the vehicle battery 126 based on a temperature of the vehicle battery 126. However, it is understood that the battery management system may provide instructions to the vehicle battery 126 based on any measure associated with the vehicle battery 126 such as power state of the vehicle 110, a time period of at least one day that the vehicle 110 is in an off-state, or a combination thereof. The battery management system ensures acceptable current modes of the vehicle battery 126. For example, the acceptable current modes protect against overvoltage, overcharge, and/or overheating of the vehicle battery 126. As another example, the temperature of the vehicle battery 126 indicates to the battery management system whether any of the acceptable current modes are within acceptable temperate ranges. The battery management system associated with the vehicle battery 126 communicates information associated with the temperature of the vehicle battery 126 to the remote start wake-up algorithm 113b. For example, the vehicle 110 utilizes the remote start wake-up algorithm 113b to process and send information received regarding the vehicle battery 126 to the infrastructure 108. As another example, the vehicle 110 utilizes the remote start wake-up algorithm 113b to process and send information regarding the vehicle battery 126 to the vehicle manufacturing cloud 102 directly. The remote start wake-up algorithm 113b is configured to communicate information and/or instructions to the vehicle battery 126 received from the infrastructure 108 and/or the vehicle manufacturing cloud 102.

The vehicle GNSS 128 is configured to communicate with satellites so that the vehicle 110 can determine a specific location of the vehicle 110. The vehicle navigation maps 132 can display, via a display screen (not shown), the specific location of the vehicle 110 to the user 144. The vehicle GNSS 128 communicates geographical information associated with the vehicle 110 to the remote start wake-up algorithm 113b. For example, the vehicle 110 utilizes the remote start wake-up algorithm 113b to process and send information received from the vehicle GNSS 128 to the infrastructure 108. As another example, the vehicle 110 utilizes the remote start wake-up algorithm 113b to process and send information from the vehicle GNSS 128 to the vehicle manufacturing cloud 102 directly. The remote start wake-up algorithm 113b is configured to communicate information and/or instructions to the vehicle GNSS 128 received from the infrastructure 108 and/or the vehicle manufacturing cloud 102. As another example, the vehicle 110 utilizes the remote start wake-up algorithm 113b to process and send information associated with the vehicle navigation maps 130 to the infrastructure 108. As another example, the vehicle 110 utilizes the remote start wake-up algorithm 113b to process and send information from the vehicle navigation maps 132 to the vehicle manufacturing cloud 102 directly. The remote start wake-up algorithm 113b is configured to communicate information and/or instructions to the vehicle navigation maps 130 received from the infrastructure 108 and/or the vehicle manufacturing cloud 102.

The vehicle exterior lights 132 can include one or more lights that are embedded around a perimeter of the vehicle 110. For example, the vehicle exterior lights 132 include, but are not limited to, low-beam headlamps, high-beam headlamps, park lights, daytime running lights, fog lights, signal lights, side marker lights, cab lights, taillights, brake lights, center mouth brake lights, and/or reverse lights. The vehicle exterior lights 132 are configured to turn ON and OFF automatically based on an exterior weather condition. The vehicle exterior lights 132 are also configured to turn ON and OFF automatically based on brightness of a light adjacent to the vehicle 110, such as sunlight, artificial light, and/or an absence of light and/or a reduction in the light. The vehicle exterior lights 132 are further configured to turn ON and OFF manually by the user 144. Additionally, the vehicle exterior lights 132 are configured to turn ON and OFF in a pattern to provide visual notification or information, such as an indication of one or more faults. For example, the one or more faults can be an unplanned disconnection between the infrastructure 108 and the vehicle 110 that may be associated with, but is not limited to, an onboarding, offboarding, and/or re-onboarding of the vehicle 110 with the infrastructure 108. The vehicle 110 communicates one or more instructions to the vehicle exterior lights 132 based on the remote start wake-up algorithm 113b. For example, the vehicle 110 communicates one or more instructions received from the infrastructure 108 to the vehicle exterior lights 132. As another example, the vehicle 110 communicates one or more instructions received directly from the vehicle manufacturing cloud 102 to the vehicle exterior lights 132.

The vehicle delivery manager cloud 104 wirelessly communicates (e.g., receives and/or sends instructions and/or information) with one or more of a rental agencies cloud 134, a valet parking agencies cloud 136, an insurance agencies cloud 138, and/or a dealership 140. The vehicle delivery manager cloud 104 is configured to facilitate the delivery of the one or more vehicles to any of a rental agency (not shown) associated with the rental agencies cloud 134, a valet parking agency (not shown) associated with the valet parking agencies cloud 136, an insurance agency (not shown) associated with the insurance agencies cloud 138, and/or the dealership 140. The vehicle delivery manager cloud 104 also wirelessly communicates with the vehicle customer web-portal account 106. It should be understood that other cloud systems can be included, in one or more examples.

The delivery manager cloud 104 wirelessly communicates with a user device 142 such as a mobile device, a display panel, and/or a computer. The vehicle 110 also configured to wirelessly communicate directly with the user device 142. For example, a user 144 engages with the user device 142 via an application that organizes any information and/or instructions received from the vehicle customer web-portal account 106 and/or the vehicle 110. As another example, the user 144 may send one or more instructions to the vehicle customer web-portal account 106 such as making a selection of which vehicle the user 144 would like to receive from any of the rental agency associated with the rental agencies cloud 134, the valet parking agency associated with the valet parking agencies cloud 136, the insurance agency associated with the insurance agencies cloud 138, and/or the dealership 140.

Figure 2:
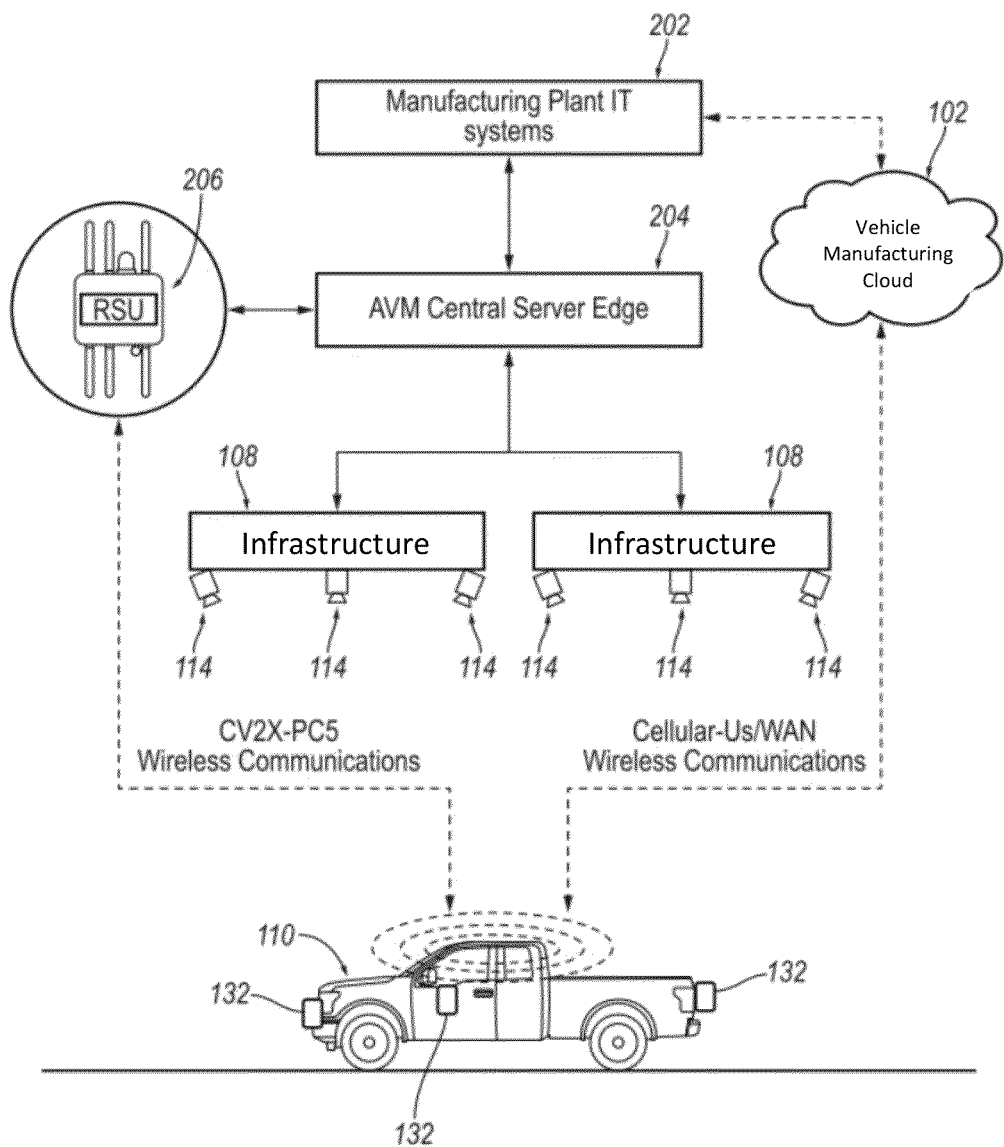
FIG. 2 illustrates an implementation of a system for automated vehicle marshaling in accordance with various implementations.

FIG. 2 illustrates the engagement of the vehicle 110 with the infrastructure 108 in an instance wherein the vehicle 110 is wirelessly communicative with the infrastructure 108. For example, there may be an instance where the vehicle 110 will not be able to communicate with the infrastructure 108, as will be described. In other words, there may be an instance where the infrastructure 108 may not be able to detect the vehicle 110, as will be described. Generally, in this particular example, a manufacturing plant information technology (IT) system(s) 202 wirelessly communicates with the vehicle manufacturing cloud 102. The manufacturing plant information technology system(s) 202 is also connected to an AVM central server edge 204. It is understood that the manufacturing plant information technology system(s) 202 may be wirelessly connected to the AVM central server edge 204, wherein the manufacturing plant information technology system(s) 202 is configured to communicate with the AVM central server edge 204. It is also understood that the manufacturing plant information technology system(s) 202 may be hardwired to the AVM central server edge 204. The AVM central server edge 204 receives one or more signals from a roadside unit (RSU) 206. It is understood that the AVM central server edge 204 may be wirelessly connected to the one or more infrastructures (e.g., the infrastructure 108) and is configured to communicate with the one or more infrastructures (e.g., the infrastructure 108). It is also understood that the AVM central server edge 204 may be hardwired to the one or more infrastructures. The vehicle 110 is wirelessly connected to each of the vehicle manufacturing cloud 102 and/or the RSU 206, wherein the vehicle 110 is configured to communicate with each of the vehicle manufacturing cloud 102 and/or the RSU 206.

The one or more infrastructures utilize the remote start wake-up algorithm 113b to cause the one or more vehicles to perform various tasks related to the marshaling of the one or more vehicles. Particularly, the various tasks may include the exchange of wake-up messages between the one or more infrastructures and the one or more vehicles to facilitate the detection of the one or more vehicles and the initiation of a remote wake-up process/action of the one or more vehicles.

Figure 3:
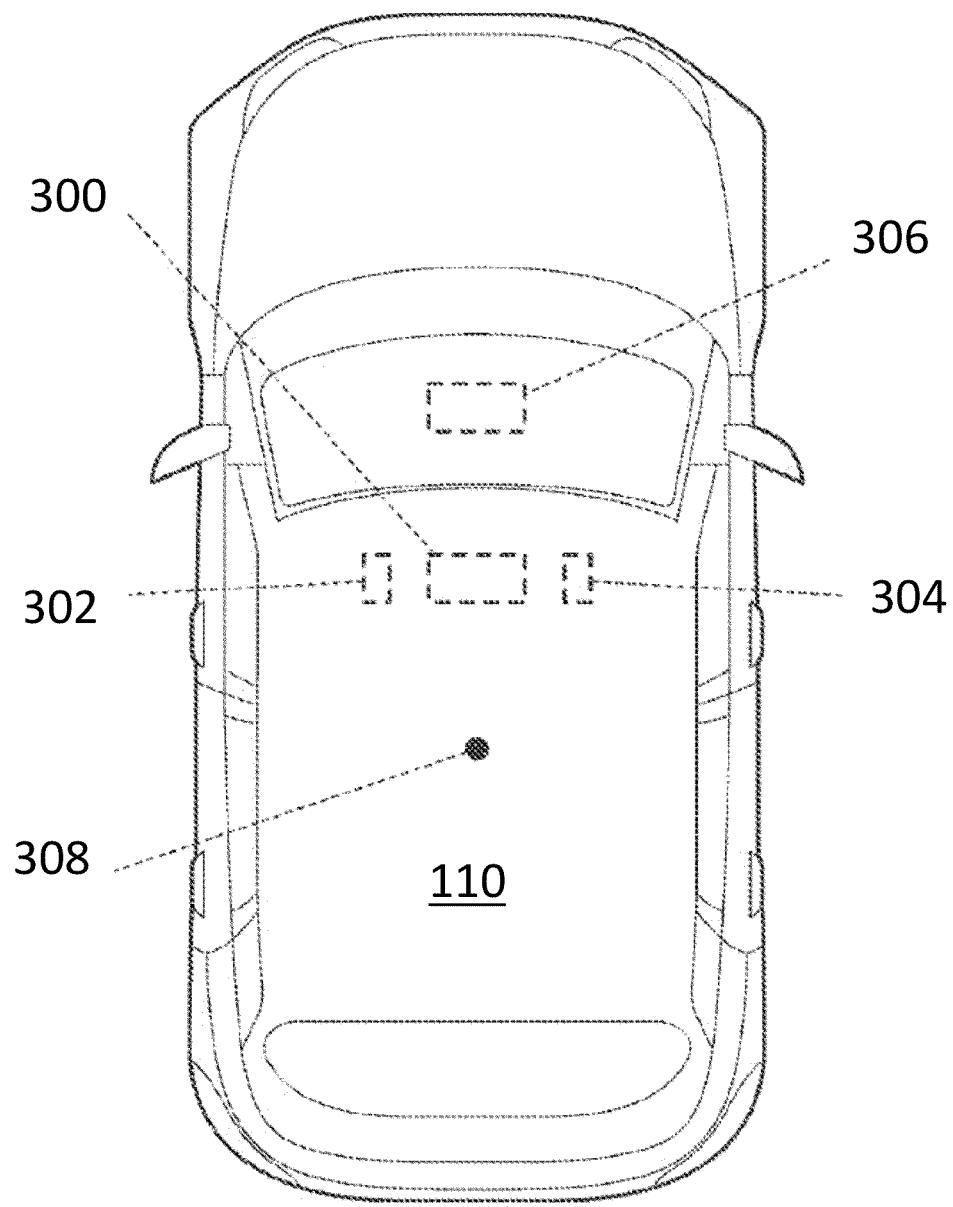
FIG. 3 illustrates a vehicle distributed by the systems shown in FIGS. 1 and 2 in accordance with various implementations.

Referring further to FIG. 3, in various forms, the one or more vehicles (e.g., the vehicle 110) may be powered in a variety of ways, for example, with an electric motor. It is understood that the one or more vehicles may also be powered with an internal combustion engine. The one or more vehicles may be any type of electrically powered vehicle such as a car, a truck, a robot, a plane and/or a boat, for example. The one or more vehicles include a controller 300, one or more actuators 302, a plurality of on-board sensors 304, and a human machine interface (HMI) 306. The one or more vehicles have a reference point 308, that is, a specified point within the space defined by a vehicle body, for example, a geometrical center point at which respective longitudinal and lateral center axes of each of the one or more vehicles intersect. The reference point 308 identifies the location of the one or more vehicles, for example, a point at which the one or more vehicles are located as the one or more vehicles navigate toward a waypoint.

The controller 300 operates the one or more vehicles in an autonomous or a semi-autonomous mode. In each of the autonomous mode and/or the semi-autonomous mode, each of the propulsion, braking, and steering of the one or more vehicles are controlled by the controller 300.

The controller 300, in some examples, is configured or programmed to control the operation of one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the controller 300, as opposed to a human operator, is to control such operations. Additionally, the controller 300 is programmed to determine whether and when a human operator is to control such operations.

The controller 300 includes or may be communicatively coupled to (for example, via a vehicle communications bus) one or more processors, for example, controllers or the like included in the one or more vehicles for monitoring and/or controlling various vehicle controllers, such as a powertrain controller, a brake controller, a steering controller, etc. The controller 300 is generally arranged for communications on a vehicle communication network that can include a bus in each of the one or more vehicles such as the vehicle CAN bus 133 or the like, and/or other wired and/or wireless mechanisms.

Via a vehicle network, the controller 300 transmits messages to various devices in each of the one or more vehicles and/or receives messages from the various devices, for example, the one or more actuators 302, the HMI 306, etc. Alternatively, or additionally, in cases where the controller 300 includes multiple devices, the vehicle communication network is utilized for communications between devices represented as the controller 300 in this disclosure. Further, as discussed below, various other controllers and/or sensors provide data to the controller 300 via the vehicle communication network.

In addition, the controller 300 is configured for communicating through a wireless vehicular communication interface with other traffic objects (for example, vehicles, infrastructures, pedestrians, etc.), such as via a vehicle-to-vehicle communication network. The controller 200 is also configured for communicating through a vehicle-to-infrastructure communication network, such as communicating with the sensor component 116 of the infrastructure 108. The vehicular communication network represents one or more mechanisms by which the controller 300 of each of the one or more vehicles communicates with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 302 are implemented via circuits, chips, or other electronic and/or mechanical components that can actuate various vehicle subsystems in accordance with appropriate control signals. The actuators 302 may be used to control braking, acceleration, and/or steering of the one or more vehicles. The controller 300 can be programmed to actuate the vehicle actuators 302 including propulsion, steering, and/or braking based on the planned acceleration or deceleration of the one or more vehicles.

The HMI 306 is configured to receive information from a user, such as a human operator, during operation of the one or more vehicles. Moreover, the HMI 306 is configured to present information to the user, such as, an occupant of one or more of the vehicles 110. In some variations, the controller 300 is programmed to receive destination data, for example, location coordinates, from the HMI 306.

The sensors 304 include a variety of devices to provide data to the controller 300. For example, the sensors 304 may include object detection sensors such as lidar sensor(s) disposed on or in each of the one or more vehicles that provide relative locations, sizes, and shapes of one or more targets surrounding the one or more vehicles, for example, additional vehicles, bicycles, pedestrians, robots, drones, etc., traveling next to, ahead, and/or behind any of the one or more vehicles. As another example, one or more of the sensors can be radar sensors fixed to one or more bumpers of the one or more vehicles that may provide locations of the target(s) relative to the location of each of the one or more vehicles.

The object detection sensors may include a camera sensor, for example, to provide a front view, side view, rear view, etc., providing images from an area surrounding the one or more vehicles. For example, the controller 300 may be programmed to receive image data from the camera sensor(s) and to implement image processing techniques to detect a road, infrastructure elements, etc. The controller 300 may be further programmed to determine a current vehicle location based on location coordinates, for example, GPS coordinates, received from the one or more vehicles and indicative of a location of the one or more vehicles from a GPS sensor. Accordingly, each of the one or more vehicles can be autonomously guided toward a waypoint using a combination of the sensors 114 and the vehicle sensors (e.g., the onboard sensors 304).

Figure 4:
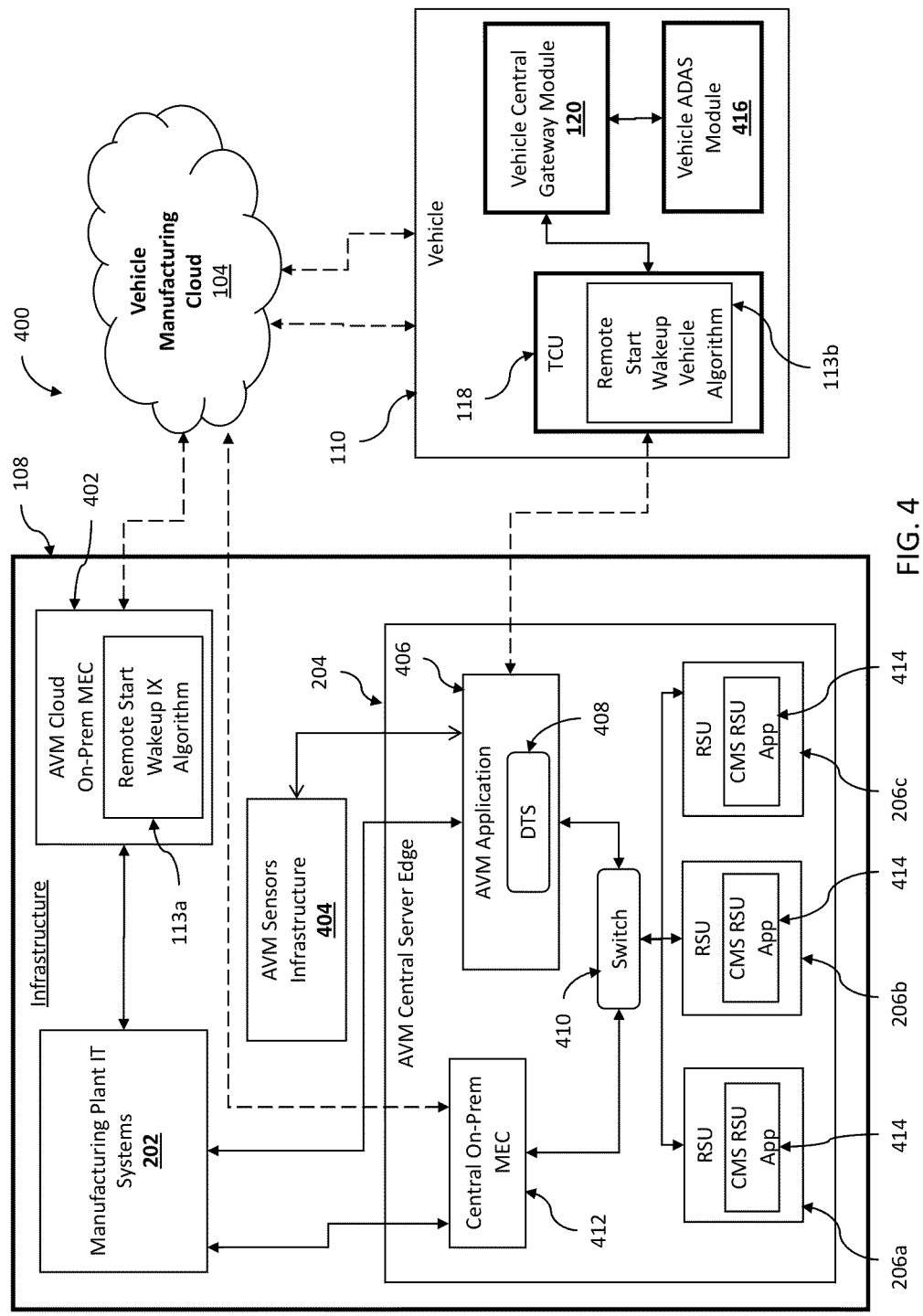
FIG. 4 illustrates a system for remotely waking-up the vehicle shown in FIG. 3 in accordance with various implementations.

In another embodiment, FIG. 4, shows a system 400 configured to facilitate the communication and remote wake-up functionality between the infrastructure 108 and the one or more vehicles (e.g., the vehicle 110). Generally, the infrastructure 108 communicates with the vehicle 110 using one of two means, either via a cellular protocol or a secure wireless protocol. However, it is understood that the infrastructure 108 may communicate with the vehicle 110 by any other means. It is also understood that the secure wireless protocol may include and/or be sent via a CV2X-PC5 protocol. However, it is understood that any secure communicative protocol may be used. More specifically, the remote start wake-up algorithm 113b installed on the vehicle 110 is utilized to optimize management of the remote wake-up of the vehicle 110 and shutdown to provide quick control capability to the infrastructure 108 using CV2X-PC5 wireless communication.

The infrastructure 108, as illustrated in FIG. 4, generally includes the manufacturing plant IT system(s) 202, an AVM cloud on-premises (on-prem) multi-access edge computing (MEC) component 402, an AVM sensor infrastructure 404, and the AVM central server edge 204. The AVM central server edge 204 operates as the central server of the infrastructure 108 that utilizes an AVM application 406 to process communication ultimately received from each of the remote start wake-up IX algorithm 113a installed in the infrastructure 108 and the remote start wake-up algorithm 113b installed within the vehicle 110. The AVM application 406 is configured to communicate directly with the vehicle 110 using a wireless CV2X-PC5 protocol to initiate and/or maintain a marshaling flow associated with an onboarding, offboarding, and/or re-onboarding of the vehicle 110 with the infrastructure 108. The AVM application 406 is also configured to communicate the marshaling flow associated with an onboarding, offboarding, and/or re-onboarding of the vehicle 110 with the infrastructure 108 with the manufacturing plant IT system component(s) 202. It is understood that the AVM application 406 may be wirelessly connected to the manufacturing plant IT system component(s) 202. It is also understood that the AVM application 406 may be hardwired to the manufacturing plant IT system component(s) 202.

The manufacturing plant IT system(s) 202 is configured to communicate with the AVM cloud on-prem MEC 402. The AVM cloud on-prem MEC 402 includes the remote start wake-up IX algorithm 113a. For example, the AVM cloud on-prem MEC 402 can communicate commands based on one or more decisions made by the remote start wake-up IX algorithm 113a. The decisions made by the remote start wake-up IX algorithm 113a is based on critical information stored within the AVM cloud on-prem MEC 402. The decisions made by the remote start wake-up IX algorithm 113a is alternatively based on non-critical information stored by the vehicle manufacturing cloud 104. For example, the critical information may include, but is not limited to, the vehicle battery's state of charge (e.g., low voltage, high voltage, or a combination thereof), the vehicle's odometry mileage, the vehicle's gear status (e.g., park/reverse/neutral/drive/low), the vehicle's power mode status, the vehicle's wireless communication status, the vehicle's location, the infrastructure's emergency stop state associated with the one or more vehicles, and/or the infrastructure's station status associated with the one or more vehicles. As another example, the non-critical information may include, but is not limited to, the vehicle's feature activation status, the vehicle's feature de-activation status, the vehicle's power mode state during activation, the vehicle's power mode state during de-activation, and logging off a respective vehicle's critical functions in the instance wherein one or more critical functions become non-critical in association with the vehicle manufacturing cloud 104. Additionally, the AVM on-prem MEC 402 is configured to communicate the marshaling flow associated with an onboarding, offboarding, and/or re-onboarding of the vehicle 110 with the infrastructure 108 with the vehicle manufacturing cloud 104, for example. As another example, the manufacturing plant IT system(s) 202 is configured to communicate the marshaling flow associated with an onboarding, offboarding, and/or re-onboarding of the vehicle 110 with the infrastructure 108 with the AVM cloud on-prem MEC 113a. It is understood that the AVM cloud on-prem MEC 402 may be wirelessly connected to the manufacturing plant IT system(s) 202. It is also understood that the AVM cloud on-prem MEC 402 may be hardwired to the manufacturing plant IT system(s) 202. It is additionally understood that the AVM cloud on-prem MEC 402 is wirelessly connected to the vehicle manufacturing cloud 104. While FIG. 4 illustrates the use of a locally disposed MEC (e.g., the AVM cloud on-prem MEC 402) relative to the infrastructure 108, it is understood that a remote MEC may also be used. It is understood that in the instance wherein a remote MEC is used, the remote MEC may be implemented within at least the system 400 in the same manner as the AVM cloud on-prem MEC 402.

The AVM application is further configured to communicate with the AVM sensor(s) infrastructure 404. The AVM sensor(s) infrastructure 404 is configured to process sensor inputs and/or outputs associated with the one or more sensors 114. For example, the vehicle 110 may communicate various statuses associated with the onboarding, offboarding, and/or re-onboarding to the one or more sensors 114, via the AVM application 406. The AVM application 406 includes a data translating service 408 that initially receives the various statuses communicated from the vehicle 110 and translates the various statuses before sending the various statuses to the AVM sensor(s) infrastructure 404. The AVM sensor(s) is configured to receive the translated various statuses from the AVM application 406 and processes the various statuses. It is understood that the AVM application 406 may be wirelessly connected to the AVM sensor(s) infrastructure 404. It is also understood that the AVM application 406 may be hardwired to the AVM sensor(s) infrastructure 404.

A switch 410 is utilized within the infrastructure 108, allowing for the AVM application 406 to communicate with one or more RSUs (e.g., 206a-206c) and a central on-prem MEC 412. The AVM application 406 is additionally configured to process the commands from the AVM cloud on-prem MEC 402 and instruct the central on-prem MEC 412 and/or the one or more RSUs to take an action. For example, the central on-prem MEC 412 communicates directly with the vehicle manufacturing cloud 104 and/or the manufacturing plant IT system(s) 202. As another example, the one or more RSUs communicate directly with the vehicle 110. It is understood that the switch 410 may wirelessly connect each of the AVM application 406, the central on-prem MEC 412, and the one or more RSUs. It is also understood that the switch 410 may be hardwired to each of the AVM application 406, the central on-prem MEC 412, and the one or more RSUs.

The one or more RSUs are configured to send a remote start wake-up message to the vehicle 110. It is understood that the remote start wake-up message is sent via a CV2X-PC5 protocol. Each of the one or more RSUs include a content management system (CMS) RSU application 414 that is utilized by the one or more RSUs to process a wake-up message response status received from the vehicle 110.

The vehicle 110 generally includes the TCU 118, the vehicle central gateway module, and a vehicle advanced driver-assistance system (ADAS) module 416. The TCU 118 is configured to utilize the remote start wake-up algorithm 113b disposed as a component within the TCU 118 to process information gathered by one or more sensors, as is described above. The vehicle central gateway module 120 operates as an interface between at least the TCU 118 and the vehicle ADAS module 416, such as the vehicle CAN bus 133 for example. It is understood that the vehicle central gateway module 120 may wirelessly connect each of the TCU 118 and the vehicle ADAS module 416. It is also understood that the vehicle central gateway module 120 may be hardwired to each of the TCU 118 and the vehicle ADAS module 416.

The vehicle 110 is also configured to communicate via a cellular means with the vehicle manufacturing cloud 104. For example, the vehicle may communicate a marshaling flow associated with an onboarding, offboarding, and/or re-onboarding of the vehicle 110 with the vehicle manufacturing cloud via a wireless connection. While the infrastructure 108 is depicted as communicating with the vehicle 110 so that the vehicle 110 may be remotely woken-up, it is understood that a user device (e.g., a phone, computer, etc.) may be used as a key, wherein the user device will replace the functionality of the infrastructure 108, in an embodiment. It is understood that any operating device that has functionality to function as the infrastructure 108 as it has been described may replace the infrastructure 108 in its communication with the vehicle 108.

Figure 5:
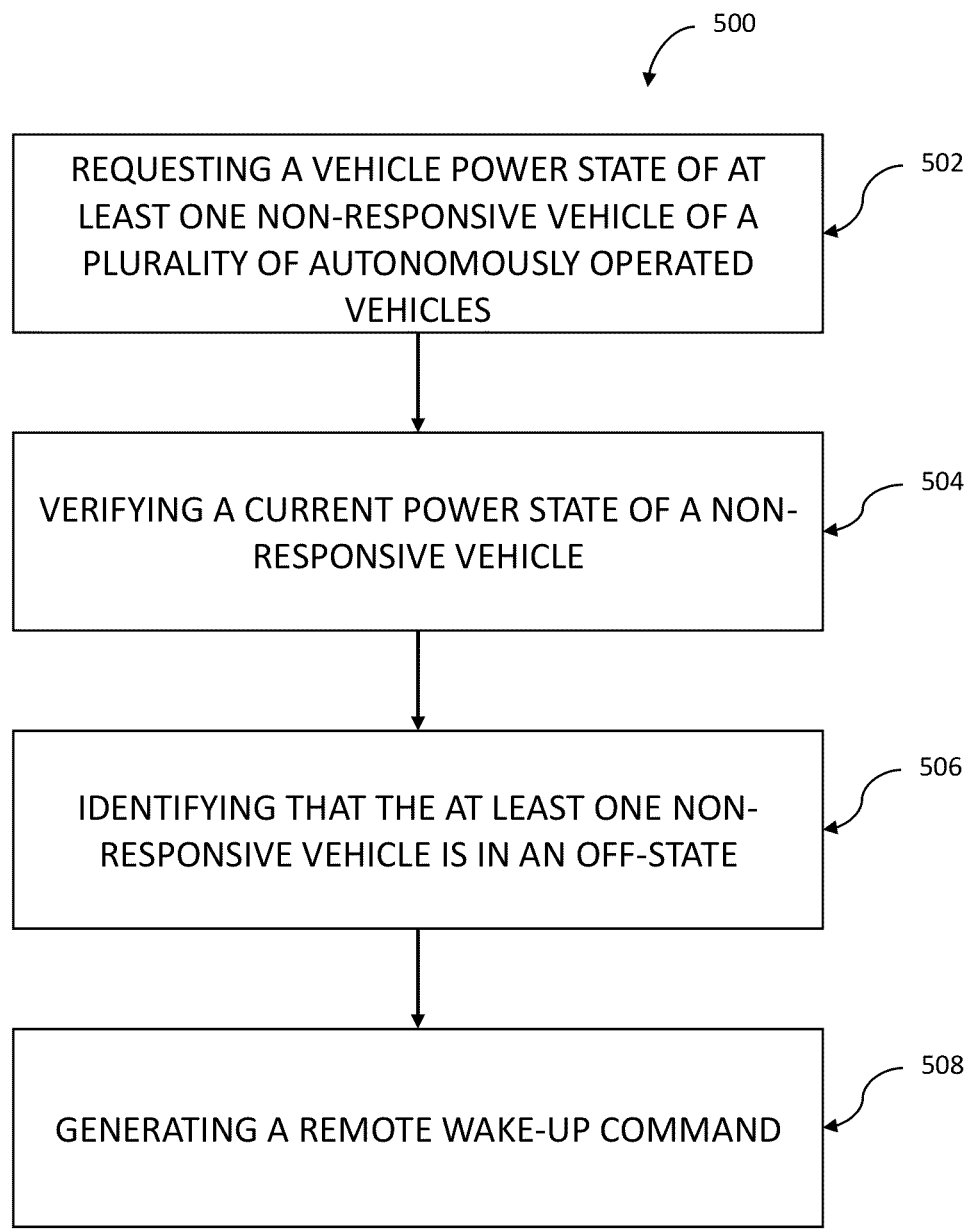
FIG. 5 is a flowchart illustrating an example method for remotely waking-up the vehicle shown in FIG. 3 in accordance with various implementations.

FIG. 5 is a flow chart illustrating an example method 500 for remotely waking-up a vehicle (e.g., the vehicle 110). At operation 502, a vehicle power state of at least one non-responsive vehicle of a plurality of autonomously operated vehicles is requested. At operation 504, a current power state of the at least one non-responsive vehicle is verified. For example, the verification of the current power state of the at least one non-responsive vehicle is enabled via a remote-start-wakeup automated vehicle marshaling (AVM) algorithm. As another example, the remote-start-wakeup AVM algorithm is installed within an infrastructure (e.g., the infrastructure 108). As a further example, the verification of the current power state of the at least one non-responsive vehicle is enabled in response to the request for the vehicle power state of the at least one non-responsive vehicle. Additionally, the verification of the current power state of the at least one non-responsive vehicle is enabled via the remote-start-wakeup AVM algorithm and in response to the request for the vehicle power state of the at least one non-responsive vehicle.

At operation 506, the at least one non-responsive vehicle being in an off-state is identified. For example, the at least one non-responsive vehicle being in an off-state is identified based on the current power state of the at least one non-responsive vehicle failing to exceed a threshold. It is understood that the threshold is defined by the current power state failing to exceed a minimum charge-value, a time period of at least one day that the at least one non-responsive vehicle is in the off-state, or a combination thereof.

At operation 508, a remote wake-up command is generated. For example, the remote wake-up commend is generated based on identifying that the at least one non-responsive vehicle is in the off-state. As another example, the remote wake-up command is wirelessly transmitted to the at least one non-responsive vehicle via a CV2X-PC5 protocol. As a further example, a power mode state of the at least one non-responsive vehicle is caused to be switched from a full power mode to a low power mode. The power mode state of the at least one non-responsive vehicle being caused to switch from the full power mode to the low power mode is based on identifying that the at least one non-responsive vehicle is in the off-state, for example. As another example, the at least one non-responsive vehicle is caused to enter the off-state. The at least one non-responsive vehicle is caused to enter the off-state based on switching from the full power mode to the low power mode.

In an embodiment, one or more commands are broadcasted. For example, the one or more commands are broadcasted to each of the vehicles of the plurality of autonomously operated vehicles. For example, the one or more commands include the remote wake-up command. In another embodiment, a return message is received. For example, the return message is received from each of the vehicles of the plurality of autonomously operated vehicles. As another example, the return message is received based on the broadcasted one or more commands. As a further example, the return message confirms receipt of the broadcasted one or more commands. In yet another embodiment, a globally unique identifier (GUID) associated with the infrastructure is determined to match the GUID of the return message. For example, the determination of whether the GUID associated with the infrastructure matches the GUID of the return message is made by the AVM algorithm.

In an embodiment, battery data associated with the at least one non-responsive vehicle is received. For example, the battery data associated with the at least one non-responsive vehicle is received based on the current power state of the at least one non-responsive vehicle failing to exceed the threshold. As another example, the battery data may include a discharge status of a low voltage battery state and a high voltage battery state corresponding to the at least one non-responsive vehicle. However, in another example, the battery data may include a charge utilization status of a low voltage battery state and a high voltage battery state corresponding to the at least one non-responsive vehicle.

Figure 6:
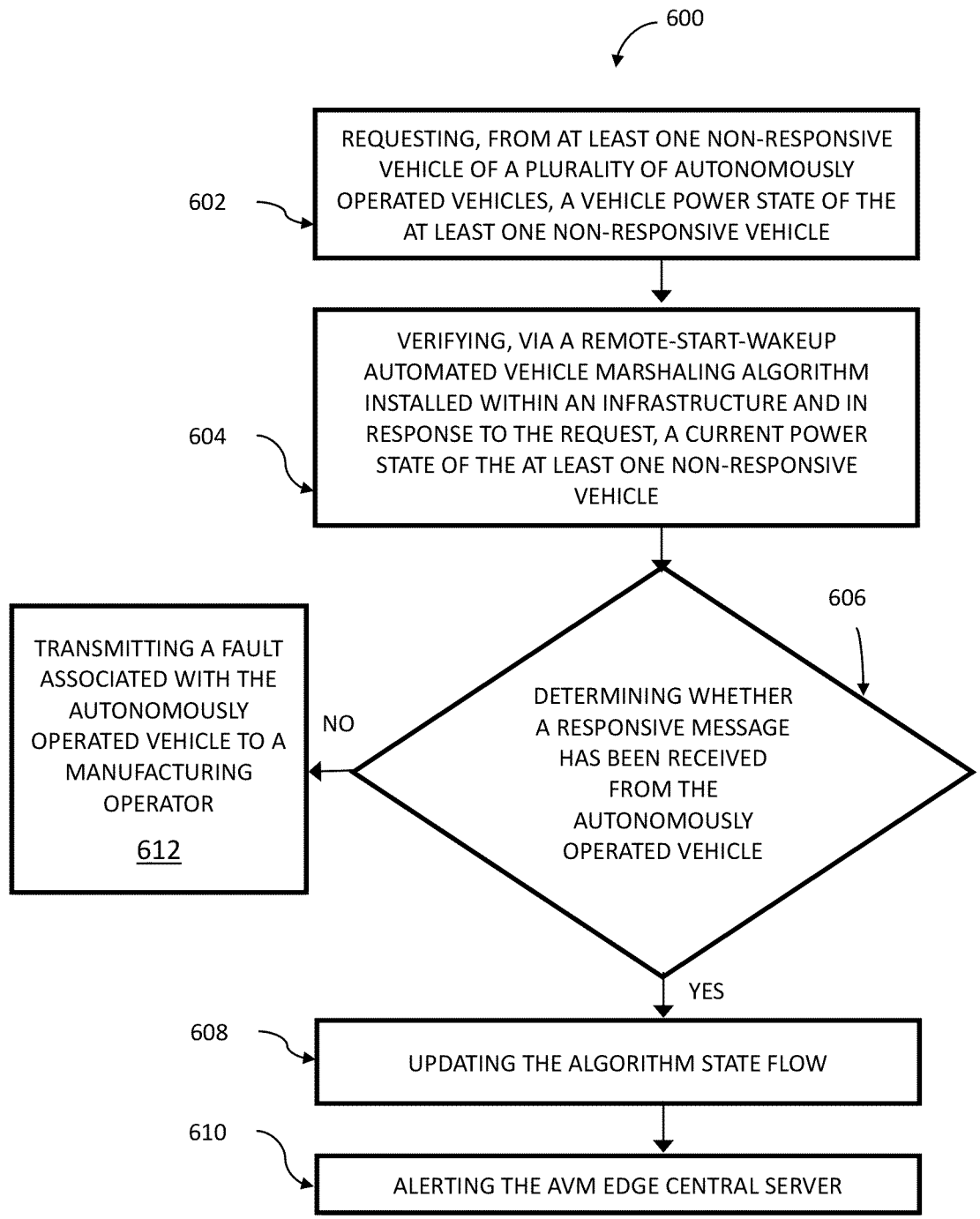
FIG. 6 is a flowchart illustrating another example method for remotely waking-up the vehicle shown in FIG. 3 in accordance with various implementations.

FIG. 6 is a flow chart illustrating an example method 600 for remotely waking-up a vehicle (e.g., the vehicle 110). At operation 602, a vehicle power state of at least one non-responsive vehicle of a plurality of autonomously operated vehicles is requested. At operation 604, a current power state of the at least one non-responsive vehicle is verified. For example, the verification of the current power state of the at least one non-responsive vehicle is enabled via a remote-start-wakeup automated vehicle marshaling (AVM) algorithm. As another example, the remote-start-wakeup AVM algorithm is installed within an infrastructure (e.g., the infrastructure 108). As a further example, the verification of the current power state of the at least one non-responsive vehicle is enabled in response to the request for the vehicle power state of the at least one non-responsive vehicle. Additionally, the verification of the current power state of the at least one non-responsive vehicle is enabled via the remote-start-wakeup AVM algorithm and in response to the request for the vehicle power state of the at least one non-responsive vehicle.

At operation 606, a determination is made regarding whether a response message has been received from the autonomously operated vehicle. In an instance wherein the response message has been received from the autonomously operated vehicle, an algorithm state flow is updated in operation 608. In operation 610, the AVM central server edge (e.g., the AVM central server edge 204) is alerted that the response message has been received from the autonomously operated vehicle and/or the algorithm state flow has been updated. However, in an instance wherein the response message has not been received from the autonomously operated vehicle, a fault associated with the autonomously operated vehicle is transmitted to a manufacturing operator at step 612.

Figure 7:
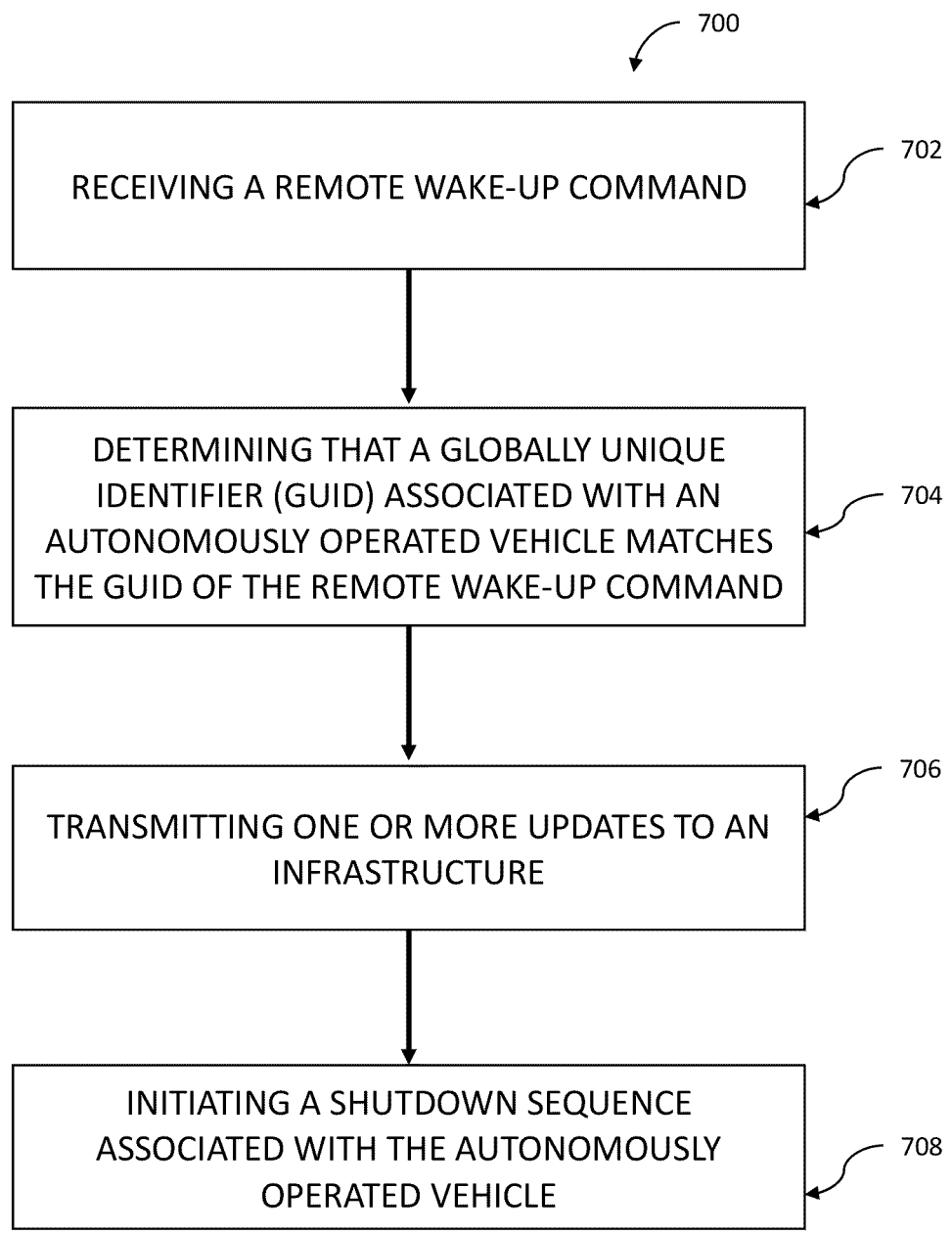
FIG. 7 is a flowchart illustrating another example method for remotely waking-up the vehicle shown in FIG. 3 in accordance with various implementations.

FIG. 7 is a flow chart illustrating an example method 600 for remotely waking-up a vehicle (e.g., the vehicle 110). At operation 702, a remote wake-up command is received. For example, the remote wake-up command is received at an autonomously operated vehicle in an off-state. As an additional example, the remote wake-up command is received from an infrastructure (e.g., the infrastructure 108). As another example, the remote wake-up command is wirelessly transmitted via a CV2X-PC5 protocol. The remote wake-up command can be received by the vehicle once a remote-start-wakeup automated vehicle marshaling (AVM) algorithm installed on the autonomously operated vehicle activates a wake-up process. The wake-up process provides a trigger for the AVM algorithm to activate a full power mode on a transmission control unit of the vehicle (e.g., the wireless transmission module 118). The full power mode is communicated to respective vehicular modules and/or the remote-start-wakeup AVM algorithm installed within the infrastructure. Alternatively, the AVM installed on the autonomously operated vehicle may deactivate the wake-up process. The deactivation of the wake-up process provides a trigger for the AVM algorithm to activate a low power mode on the transmission control unit of the vehicle to deactivate the wake-up process. The low power mode is communicated to the respective vehicular modules and/or the remote-start-wakeup AVM algorithm installed within the infrastructure. It is understood, however, that the remote wake-up command may be received at any time, including before the activation of the wake-up command is initiated.

At operation 704, a globally unique identifier (GUID) associated with the autonomously operated vehicle is determined to match the GUID of the remote wake-up command. For example, the determination of whether the GUID associated with the autonomously operated vehicle matches the GUID of the remote wake-up command is made by a remote-start-wakeup AVM algorithm. In an instance wherein the GUID associated with the autonomously operated vehicle is determined to match the GUID of the remote wake-up command, software on-board the vehicle is activated. Upon activation of the on-board software, the AVM provides for the capability of the vehicle to receive transmitted messages from the infrastructure 108, as is further described.

At operation 706, one or more updates are transmitted to the infrastructure. For example, the one or more updates are transmitted to the infrastructure based on a low power supply battery and/or a high power supply battery exceeding a power threshold. As another example, the one or more updates are transmitted to the infrastructure based on the GUID of the autonomously operated vehicle matching the GUID of the remote wake-up command. As a further example, the one or more updates are transmitted to the infrastructure based on a low power supply battery and/or a high power supply battery exceeding a power threshold and on the GUID of the autonomously operated vehicle matching the GUID of the remote wake-up command.

At operation 708, a shutdown sequence associated with the autonomously operated vehicle is initiated. For example, the shutdown sequence associated with the autonomously operated vehicle is initiated based on the one or more updates sent to the infrastructure. As an example, battery data associated with the autonomously operated vehicle is transmitted. The battery data associated with the autonomously operated vehicle is transmitted to the infrastructure, for example. As an additional example, the battery data associated with the autonomously operate vehicle is transmitted in response to a specified charge associated with the low power supply battery and/or the high power supply battery falling below the power threshold. For example, the autonomously operated vehicle is stopped. The autonomously operated vehicle is stopped based on the battery data, for example. As another example, the autonomously operated vehicle is disconnected from the infrastructure. The autonomously operated vehicle is disconnected from the infrastructure based on the battery data, for example. The autonomously operated vehicle is disconnected from the infrastructure based on the autonomously operated vehicle being stopped, for example. As another example, the autonomously operated vehicle is disconnected from the infrastructure based on the autonomously operated vehicle being stopped and the battery data.

For example, the battery data includes a discharge status of a low voltage battery state and a high voltage battery state corresponding to the autonomously operated vehicle. However, in another example, the battery data may include a charge utilization status of a low voltage battery state and a high voltage battery state corresponding to the autonomously operated vehicle. In an embodiment, the low power supply battery and the high power supply battery is monitored when the autonomously operated vehicle is in the off-state.

Figure 8:
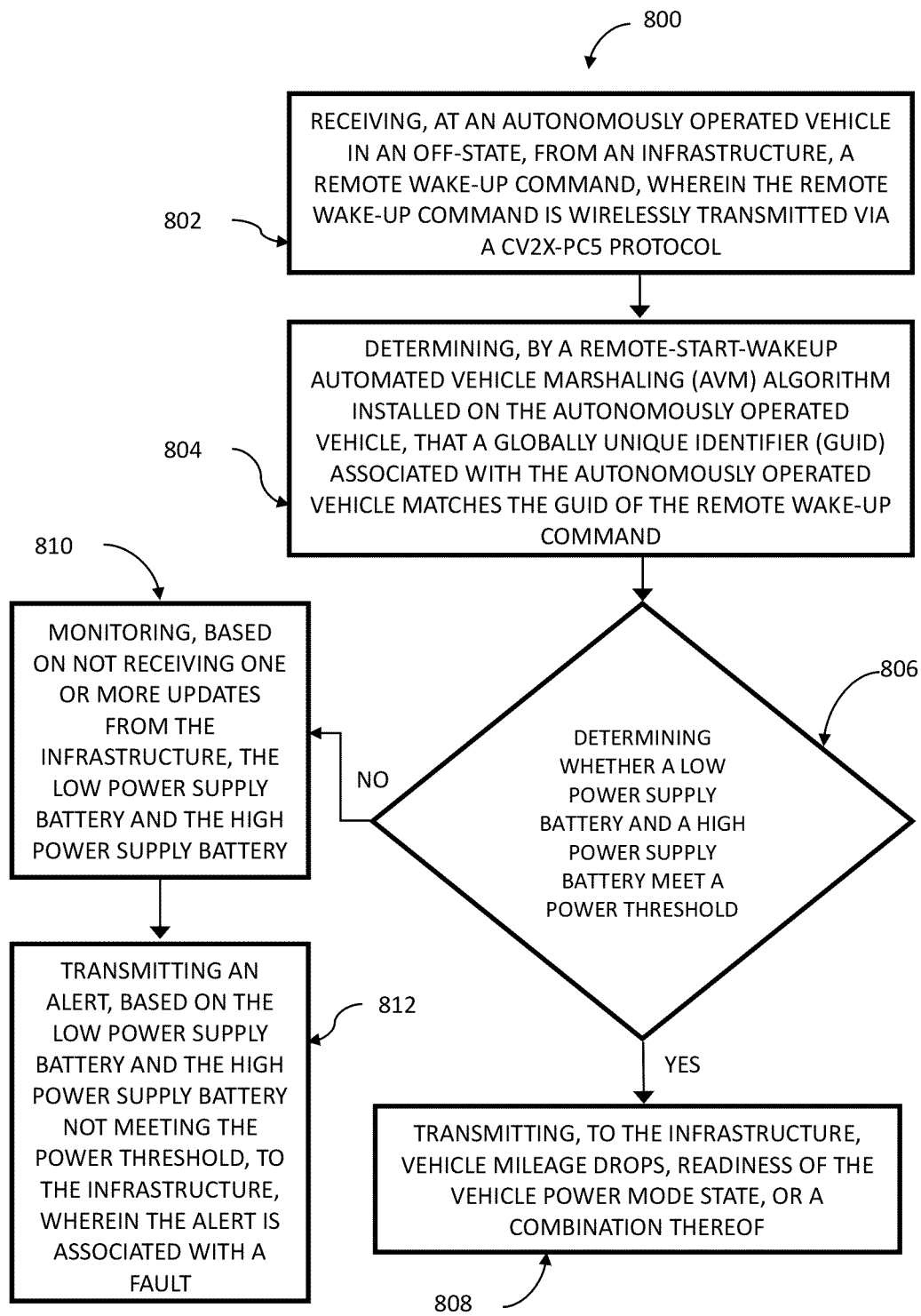
FIG. 8 is a flowchart illustrating another example method for remotely waking-up the vehicle shown in FIG. 3 in accordance with various implementations.

FIG. 8 is a flow chart illustrating an example method 800 for remotely waking-up a vehicle (e.g., the vehicle 110). At operation 802, a remote wake-up command is received. For example, the remote wake-up command is received at an autonomously operated vehicle in an off-state. As an additional example, the remote wake-up command is received from an infrastructure (e.g., the infrastructure 108). As another example, the remote wake-up command is wirelessly transmitted via a CV2X-PC5 protocol. At operation 804, a globally unique identifier (GUID) associated with the autonomously operated vehicle is determined to match the GUID of the remote wake-up command. For example, the determination of whether the GUID associated with the autonomously operated vehicle matches the GUID of the remote wake-up command is made by a remote-start-wakeup automated vehicle marshaling (AVM) algorithm installed on the autonomously operated vehicle.

At operation 806, a determination is made regarding whether a low power supply battery and/or a high power supply battery meets a power threshold. In an instance wherein the low power supply battery and/or the high power supply battery meets the power threshold, vehicle mileage drops, readiness of the vehicle power mode state, or a combination thereof is transmitted to the infrastructure at step 808.

In an instance wherein the low power supply battery and/or the high power supply battery does not meet the power threshold, the low power supply battery and the high power supply battery is monitored at operation 810. For example, the low power supply battery and the high power supply battery is monitored based on not receiving one or more updates from the infrastructure. At operation 812, an alert is transmitted to the infrastructure. For example, the transmission of the alert is based on the low power supply battery and/or the high power supply battery not meeting the power threshold. For example, the alert is associated with a fault.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A computer implemented method comprising:
   requesting, from at least one non-responsive vehicle of a plurality of autonomously operated vehicles, a vehicle power state of the at least one non-responsive vehicle;
   verifying, via a remote-start-wakeup automated vehicle marshaling (AVM) algorithm installed within an infrastructure and in response to the request, a current power state of the at least one non-responsive vehicle;
   identifying, based on the current power state of the at least one non-responsive vehicle failing to exceed a threshold, that the at least one non-responsive vehicle is in an off-state; and
   generating, based on identifying that the at least one non-responsive vehicle is in the off-state, a remote wake-up command, wherein the remote wake-up command is wirelessly transmitted to the at least one non-responsive vehicle.

2. The method of claim 1, further comprising:
   broadcasting, to each of the vehicles of the plurality of autonomously operated vehicles, one or more commands, wherein the one or more commands include the remote wake-up command;
   receiving, from each of the vehicles of the plurality of autonomously operated vehicles and based on the broadcasted one or more commands, a return message, wherein the return message confirms receipt of the broadcasted one or more commands; and
   determining, by the AVM algorithm, that a globally unique identifier (GUID) associated with the infrastructure matches the GUID of the return message.

3. The method of claim 1, wherein the threshold is defined by the current power state failing to exceed a minimum charge-value, a time period of at least one day that the at least one non-responsive vehicle is in the off-state, or a combination thereof.

4. The method of claim 1, further comprising:
   receiving, based on the current power state of the at least one non-responsive vehicle failing to exceed the threshold, battery data associated with the at least one non-responsive vehicle, wherein the battery data includes a discharge status of a low voltage battery state and a high voltage battery state corresponding to the at least one non-responsive vehicle.

5. The method of claim 1, further comprising:
   receiving, based on the current power state of the at least one non-responsive vehicle failing to exceed the threshold, battery data associated with the at least one non-responsive vehicle, wherein the battery data includes a charge utilization status of a low voltage battery state and a high voltage battery state corresponding to the at least one non-responsive vehicle.

6. The method of claim 1, wherein generating the remote wake-up command further comprises:
   causing, based on identifying that the at least one non-responsive vehicle is in the off-state, a power mode state of the at least one non-responsive vehicle to switch from a full power mode to a low power mode; and
   causing, based on switching from the full power mode to the low power mode, the at least one non-responsive vehicle to enter the off-state.

7. A method comprising:
   receiving, at an autonomously operated vehicle in an off-state, from an infrastructure, a remote wake-up command, wherein the remote wake-up command is wirelessly transmitted;
   determining, by a remote-start-wakeup automated vehicle marshaling (AVM) algorithm installed on the autonomously operated vehicle, that a globally unique identifier (GUID) associated with the autonomously operated vehicle matches the GUID of the remote wake-up command;
   transmitting, based on a low power supply battery and a high power supply battery exceeding a power threshold and the GUID of the autonomously operated vehicle matching the GUID of the remote wake-up command, one or more updates to the infrastructure, wherein the one or more updates are wirelessly transmitted; and
   initiating, based on the one or more updates sent to the infrastructure, a shutdown sequence associated with the autonomously operated vehicle.

8. The method of claim 7, further comprising:
   monitoring the low power supply battery and the high power supply battery when the autonomously operated vehicle is in the off-state.

9. The method of claim 7, wherein initiating the shutdown sequence further comprises:
   transmitting, to the infrastructure, in response to a specified charge associated with the low power supply battery or the high power supply battery falling below the power threshold, battery data associated with the autonomously operated vehicle;
   stopping, based on the battery data, the autonomously operated vehicle; and
   disconnecting, based on the battery data and the autonomously operated vehicle stopping, the autonomously operated vehicle from the infrastructure.

10. The method of claim 9, wherein the battery data includes a discharge status of a low voltage battery state and a high voltage battery state corresponding to the autonomously operated vehicle.

11. The method of claim 9, wherein the battery data includes a charge utilization status of a low voltage battery state and a high voltage battery state corresponding to the autonomously operated vehicle.

12. A system comprising:
    an infrastructure configured to:
      request, from at least one non-responsive vehicle of a plurality of autonomously operated vehicles, a vehicle power state of the at least one non-responsive vehicle,
      verify, via a remote-start-wakeup automated vehicle marshaling (AVM) algorithm installed within the infrastructure and in response to the request, a current power state of the at least one non-responsive vehicle,
      identify, based on the current power state of the at least one non-responsive vehicle failing to exceed a threshold, that the at least one non-responsive vehicle is in an off-state, and
      generate, based on identifying that the at least one non-responsive vehicle is in the off-state, a remote wake-up command, wherein the remote wake-up command is wirelessly transmitted to the at least one non-responsive vehicle; and
    the plurality of autonomously operated vehicles configured to:

receive, at each vehicle of the plurality of autonomously operated vehicles in the off-state, from the infrastructure, the remote wake-up command, determine, by an AVM algorithm installed on each of the vehicles of the plurality of autonomously operated vehicles, that a globally unique identifier (GUID) installed on each vehicle of the plurality of the autonomously operated vehicles matches the GUID of the remote wake-up command, transmit, based on a low power supply battery and a high power supply battery not exceeding a power threshold and the GUID associated with each vehicle of the plurality of autonomously operated vehicles matching the GUID of the remote wake-up command, one or more updates to the infrastructure, wherein the one or more updates are wirelessly transmitted, identify, based on the one or more updates sent to the infrastructure, the at least one non-responsive vehicle from the plurality of autonomously operated vehicles, and initiate, based on the identification of the at least one non-responsive vehicle, a shutdown sequence associated with the at least one non-responsive vehicle.

13. The system of claim 12, wherein the infrastructure is further configured to:

broadcast, to each of the vehicles of the plurality of autonomously operated vehicles, one or more commands, wherein the one or more commands include the remote wake-up command;

receive, from each of the vehicles of the plurality of autonomously operated vehicles and based on the broadcasted one or more commands, a return message, wherein the return message confirms receipt of the broadcasted one or more commands; and determine, by the AVM algorithm installed within the infrastructure, that the GUID associated with the infrastructure matches the GUID of the return message.

14. The system of claim 12, wherein the threshold is defined by the current power state failing to exceed a minimum charge-value, a time period of at least one day that the at least one non-responsive vehicle is in the off-state, or a combination thereof.

15. The system of claim 12, wherein the infrastructure is further configured to:

receive, based on the current power state of the at least one non-responsive vehicle failing to exceed the threshold, battery data associated with the at least one non-responsive vehicle, wherein the battery data includes a discharge status of a low voltage battery state and a high voltage battery state corresponding to the at least one non-responsive vehicle.

16. The system of claim 12, wherein the infrastructure is further configured to:

receive, based on the current power state of the at least one non-responsive vehicle failing to exceed the threshold, battery data associated with the at least one non-responsive vehicle, wherein the battery data includes a charge utilization status of a low voltage battery state and a high voltage battery state corresponding to the at least one non-responsive vehicle.

17. The system of claim 12, wherein each of the vehicles of the plurality of autonomously operated vehicles are further configured to:

monitor the low power supply battery and the high power supply battery when each of the plurality of autonomously operated vehicles are in the off-state.

18. The system of claim 12, wherein each of the plurality of autonomously operated vehicles are further configured to:

transmit, to the infrastructure, in response to a specified charge associated with the low power supply battery or the high power supply battery falling below the power threshold, battery data associated with the at least one non-responsive vehicle;

stop, based on the battery data, the at least one non-responsive vehicle; and disconnect, based on the battery data and the at least one non-responsive vehicle stopping, the at least one non-responsive vehicle from the infrastructure.

19. The system of claim 18, wherein the battery data includes a discharge status of a low voltage battery state and a high voltage battery state corresponding to the autonomously operated vehicle.

20. The system of claim 18, wherein the battery data includes a charge utilization status of a low voltage battery state and a high voltage battery state corresponding to the autonomously operate vehicle.

* * * * *